United States Patent [19]

Kennedy et al.

[11] Patent Number: 5,340,881
[45] Date of Patent: Aug. 23, 1994

[54] ALDEHYDE-TELECHELIC POLYISOBUTYLENES, CATALYTIC METHOD FOR PREPARING THE SAME WITH HIGH CONVERSION AND SELECTIVITY, AND BLOCK COPOLYMERS MADE THEREFORM

[75] Inventors: Joseph P. Kennedy; Brian L. Goodall; Alexander V. Lubnin, all of Akron, Ohio

[73] Assignee: The University of Akron, Akron, Ohio

[21] Appl. No.: 976,532

[22] Filed: Nov. 16, 1992

[51] Int. Cl.$^5$ .............................................. C08F 8/00
[52] U.S. Cl. ........................... 525/333.7; 525/383
[58] Field of Search ................................ 525/333.7

[56] References Cited

U.S. PATENT DOCUMENTS 4,316,973  2/1982  Kennedy .......................... 525/366
4,467,116  8/1984  van Leeuwen et al. .
4,524,188  6/1985  Kennedy et al. ................ 525/333.7
4,680,168  7/1987  Goodall et al. .

OTHER PUBLICATIONS

"Hydroformylation of Polyisobutene" by M. Di Serio, R. Garaffa, and E. Santacesaria, "Journal of Molecular Catalysis," 69 (1991) 1-14.

Primary Examiner—Bernard Lipman
Attorney, Agent, or Firm—Hudak & Shunk Co.

[57] ABSTRACT

Aldehyde-telechelic polyisobutylenes free of other end groups such as alcohols, olefins, etc., are made by the hydroformylation of polyisobutylene having one or more olefinic end groups in the presence of a rhodium catalyst in combination with an organic phosphorus ligand. Very high conversions of olefin to aldehyde are obtained. Depending upon the number of aldehyde end groups per macromolecule, the telechelic polyisobutylene polymers can be utilized as precursors to form various types of block copolymers, e.g., AB, ABA, or radial block copolymers, with other polymers such as polyurethanes, polyesters, polyamines, and the like.

29 Claims, No Drawings

ALDEHYDE-TELECHELIC POLYISOBUTYLENES, CATALYTIC METHOD FOR PREPARING THE SAME WITH HIGH CONVERSION AND SELECTIVITY, AND BLOCK COPOLYMERS MADE THEREFORM

FIELD OF THE INVENTION

Aldehyde-telechelic polyisobutylenes are made by the hydroformylation of olefinic functional polyisobutylenes in the presence of a rhodium catalyst in combination with an organic phosphorus ligand and are useful in tailor-making block copolymers in the form of AB blocks and ABA blocks, as well as more sophisticated star or radial block copolymers.

BACKGROUND OF THE INVENTION

Heretofore, aldehyde-telechelic polyisobutylene polymers free of alcoholic functional groups were not known.

The article "Hydroformylation of Polyisobutene" M. Di Serio, R. Garaffa, and E. Santacesaria, Journal of Molecular Catalysis, 69(1991) 1-14, relates to polyisobutylene having only one olefin group per macromolecule. Conversion of the olefin end group utilizing a cobalt catalyst system was incomplete and always resulted in an alcohol and/or alkyl end group in addition to any aldehyde end group. The multiplicity of different end groups resulted in variations of reactivity and even lack thereof and failed to yield a desired block or telechelic polymer.

SUMMARY OF THE INVENTION

Aldehyde functional telechelic polyisobutylenes are produced having a molecular weight of from about 300 to about 200,000. The polymers can be monofunctional, difunctional, or trifunctional i.e., terminal end groups, or can have more complex structures such as radial or star. Such polymers are made from polyisobutylenes containing one or more olefin end groups with a preferred end group having the structure

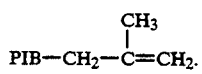

The hydroformylation of the polyisobutylene is conducted in the presence of a rhodium salt catalyst such as cyclooctadiene rhodium acetate in combination with very bulky, i.e. sterically hindered, phosphorus ligands such as tris(2,4-di-t-butylphenyl)phosphite generally at elevated temperatures and pressures. An excess of the phosphorus ligand is utilized.

The catalyst system of the present invention effects a high degree of conversion as in excess of 50 or 80 percent, generally in excess of 90 percent, and preferably in excess of 99 percent in converting the available olefin groups to an aldehyde group. Such high conversion is very desirable in subsequently utilizing the resulting aldehyde telechelic polymers to produce block copolymers.

DETAILED DESCRIPTION

The preparation of the polyisobutylenes utilized in the present invention is well known to the art and to the literature. For example, they can be made by utilizing conventional isobutylene initiators known to the art and to the literature such as 2,4,4-trimethyl-2-chloropentane (TMPCl) in conjunction with a Lewis acid co-initiator such as titanium tetrachloride and an organic Lewis base such as N'N'dimethylacetamide to yield a polyisobutylene having a chlorine end group. Depending upon the number of telechelic end groups desired, e.g., 2,3,4, the polyisobutylene initiator has the same number of initiator sites, that is, chlorine atoms. Examples of other isobutylene initiators include 2-chloro-2,4,4-trimethylpentane, (1-chloro-1-methylethyl)benzene, di-initiators such as 1,4-bis(1-chloro-1-methylethyl)benzene and the like, tri-initiators such as 1,3,5-tris(1-chloro-1-methylethyl)benzene, and the like. Formulas which set forth various mono-polyisobutylene initiators include the following:

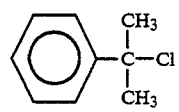

(Formula 1)

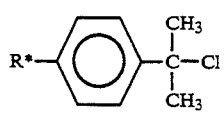

(Formula 2)

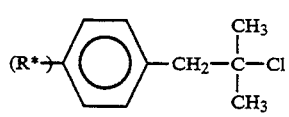

(Formula 3)

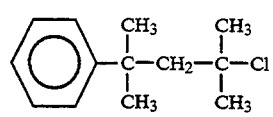

(Formula 4)

and the like, wherein R* is an alkyl group having from 1 to 10 carbon atoms, a cycloalkyl group having from 3 to 10 carbon atoms, and aryl or an alkyl-substituted aryl or an aryl-substituted alkyl group having from 6 to 12 carbon atoms. With respect to multiple initiators, formulas of suitable initiator compounds include:

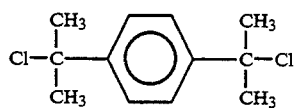

(Formula 5)

(Formula 6)

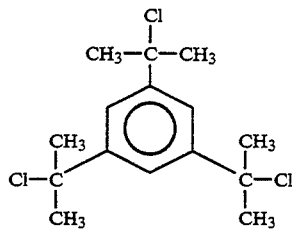

(Formula 7)

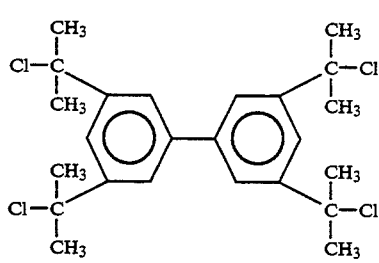

and the like.

The reaction temperature of the initiator with monomers of isobutylene is generally from about −100° C. to about 0° C. and preferably from about −80° C. to about −10° C. Examples of specific Lewis acids include $TiCl_4$, $TiBr_4$, $TiI_4$, $BCl_3$, $SnCl_4$, and $TiCl_3OR$, where R is butyl, isopropyl, etc., and mixtures thereof. Examples of specific Lewis bases include pyridine, n-$Bu_3N$, n-$Bu_2NH$, N,N-dimethylacetamide, $NH_2CONH_2$, $CH_3NO_2$, $CH_3COCH_3$, tetrahydrofuran, and the like. The mole ratio of the Lewis acid to the Lewis base is generally from about 1 to about 30, and desirably from about 2 to about 25, and preferably from about 5 to about 20.

The polymerization of the isobutylene may proceed by a living polymerization mechanism. If an olefinic terminal or end group is desired at the end of the polyisobutylene other olefins can be added so that the polyisobutylene actually contains a non-isobutylene terminal or end group. Such olefins include alkylenes having from 5 to 10 carbon atoms, cycloalkylenes having a total of from 5 to 10 carbon atoms, olefinic-substituted aromatic compounds having a total of from 8 to 20 carbon atoms, and the like. Regardless of the olefinic terminal or end group on the polymer, it is referred to herein as a polyisobutylene inasmuch as all of the repeat units with perhaps the exception of the last one or two are derived from isobutylene monomer. However, an isobutylene end group is preferred.

The chlorine-terminated polyisobutylene is then subjected to dehydrochlorination through the use of a strong base such as an alkali metal alkoxide having from 1 to 8 carbon atoms, with potassium t-butoxide being preferred. An alternative dehydrochlorination route is to pass the chlorine-terminated polyisobutylene over basic alumina. Dehydrochlorination generally occurs at temperatures from about 20° to about 100° C. and desirably from about 50° to about 80° C. under anhydrous conditions. An excess of a strong base is utilized relative to the chlorine.

Examples of polyisobutylene isomers containing an olefinic end group made in a manner described above and which can be utilized in the present invention include the following wherein the I-G through IV-G formulas relate to various types of olefin end groups and the I through IV formulas relate to isobutylene end groups.

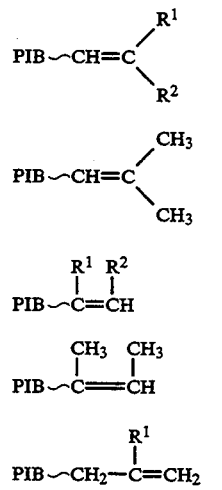

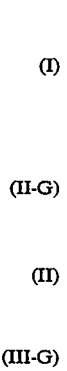

(I-G)

(I)

(II-G)

(II)

(III-G)

(III)

(IV-G)

(IV)

The $R^1$ and $R^2$ groups, independently, can be an aliphatic, desirably an alkyl group having from 1 to 6 carbon atoms, a cycloaliphatic having from 3 to 6 carbon atoms, an aromatic, or an alkyl-substituted aromatic having from 6 to 10 carbon atoms with methyl being highly preferred.

Structures III and IV are desired, with structure III, which contains a vinylidene group, being highly preferred. Structure III can generally be selectively produced in accordance with the above procedures in high amounts such as at least 80 percent, generally at least 90 percent, desirably at least 95 percent, and preferably at least 97 percent, 98 percent, 99 percent, or even 100 percent of the polyisobutylene isomers. In addition to the above structures which have an olefin end group, it is to be understood that the polyisobutylene can be difunctional, trifunctional, etc. depending upon the initiator utilized, with various olefin end groups such as set forth in the above formula generally being located on the terminal portion of the polymer. Such polymers, when hydroformylated and subsequently reacted with other polymers, will form block copolymers of the type

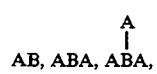

AB, ABA, ABA,

When one or more multi-functional initiators are utilized, generally star or radial block copolymers will be formed, as where n is from about 4 to about 10, as is well known to the art.

The molecular weight of such olefin-containing polyisobutylenes is generally from about 300 to about 200,000, desirably from about 500 to about 50,000, and preferably from about 550 to about 20,000. According to the present invention, high and even 100 percent conversions of the various olefinic groups to an aldehyde telechelic group is produced.

The hydroformylation of the olefin-containing polyisobutylene is desirably carried out under pressure and elevated temperature in the presence of carbon monoxide and hydrogen and a rhodium catalyst in combination with a phosphorus ligand. The mole ratio of the hydrogen gas to carbon monoxide is generally as close to 1:1 as practically possible since this is the ratio of reactants consumed in the reaction and since an excess of CO will build up pressure in the reaction vessel and eventually stop the reaction whereas a large excess of hydrogen will tend to hydrogenate the aldehyde groups of the polyisobutylene. Practical molar ratios $H_2$ to CO are thus from about 0.90 to about 2.0, desirably from about 0.9 to about 1.5, and preferably from about 0.9 to about 1.1. A large excess of the hydrogen and carbon monoxide is generally utilized in order to build up pressure in the reaction vessel with pressures from about 2 to about 50 atmospheres being desired, and from about 3 to about 35 atmospheres being preferred.

The mole ratio of the phosphorus-containing ligand to the rhodium catalyst, that is P/Rh is generally greater than 1, desirably from about 2 to about 20, and preferably from about 5 to about 15. The mole ratio of the particular olefin-containing polyisobutylene to the rhodium catalyst is generally from about 100 to about 20,000, desirably from about 200 to about 15,000, and preferably from about 500 to about 10,000. The hydroformylation reaction temperature is generally from about 60° to about 120° C. desirably from about 70° to about 100° C., and preferably from about 70° to about 90° C.

The catalyst system utilized in the hydroformylation of the olefinic polyisobutylene is generally any organic or inorganic rhodium salt, monovalent preferred, with halides not being desired since the same produces a slow reaction rate. If a rhodium halide salt is utilized, then a halide acceptor such as a basic metal salt, e.g., BaCO₃, NaHCO₃, etc., is utilized in order to minimize the poisoning effect of the halide ion. Suitable organic rhodium salts include β-diketonates such as rhodium dicarbonyl acetylacetonate, acetylacetonatobis(ethylene)rhodium with 1,5-cyclooctadiene rhodium(I) acetate being preferred. Other suitable organic rhodium salts include chlorobis(ethylene)rhodium(I), chloro(1,5-cyclooctadiene)rhodium(I)and chloronorbornadiene rhodium(I). These catalysts, such as 1,5-cyclooctadiene rhodium(I) acetate, can be made in a conventional manner such as the procedure of Chatt and Venanzi, J. Chem. Soc., 1957, p. 4735. This procedure essentially refluxes RhCl₃.3H₂O with cyclooctadiene in ethanol to yield cyclooctadiene rhodium chloride. The resulting orange solid is filtered off and dissolved in acetone. Potassium acetate is then added and the mixture is refluxed for 2 hours. The orange residue dissolved in the ethyl acetate is recrystallized to give orange crystals of cyclooctadiene rhodium acetate.

Examples of inorganic salts of rhodium include rhodium carbonate, rhodium sulfate, rhodium trichloride, and the like, with a halide acceptor such as barium carbonate.

Bulky phosphorus-type ligands, that is sterically hindered ligands, are utilized in association with the rhodium catalyst to increase the reactivity of the same. Such phosphorus ligands can be represented by the general formula

P(OR¹) (OR²) (OR³)

wherein P represents a phosphorus moiety and R¹, R² and R³ represent the same or dissimilar aryl groups provided that at least one of R¹, R² and R³ represent a group

wherein Q represents a group

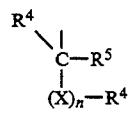

or a group

wherein each R⁴ independently can be the same or different and is hydrogen or optionally a fluorine-containing hydrocarbyl group having from 1 to 10 carbon atoms, R⁵ represents a hydrogen atom or a group R⁴, and R⁶ represents a hydrogen atom or an inert (to the hydroformylation reaction) substituent on the meta and/or para position of the ring, while X represents an oxygen or sulphur atom and n is 0 or 1, and R⁷ represents a hydrogen atom or an inert (to the hydroformylation reaction) substituent such as an alkyl, aryl, alkoxy, or aryloxy group, or a chlorine or a fluorine group.

As noted above, at least one of the groups R¹, R² and R³ in the phosphite P(OR¹)(OR²)(OR³) represents a specific ortho-substituted phenyl group. The nature of this group is rather critical with respect to the hydroformylation of olefin-terminated isobutylene.

Preference is given to the use of phosphites according to the general formula P(OR¹)(OR²)(OR³) wherein the groups R¹, R² and R³ are desirably identical. Examples of ortho-substituted phenyl groups which can be suitably used comprise those wherein R⁴ represents a lower alkyl group, R⁵ represents a hydrogen atom or a lower alkyl group, R⁶ represents a hydrogen atom, a fluorine or chlorine atom, an alkyl or alkoxy group having from 1 to 6 carbon atoms, and n is 0 or 1 in which case X represents an oxygen or sulphur atom, and R⁷ represents a hydrogen, fluorine or chlorine atom or a lower alkyl or alkoxy group having from 1 to 6 carbon atoms. Preference is given to the presence of orthosubstituted phenyl groups wherein R⁴ represents a methyl or ethyl group, R⁵ represents a hydrogen atom or a methyl group, R⁶ represents a hydrogen atom or methyl or ethyl group and n is 0 and R⁷ represents a hydrogen atom.

Particularly preferred phosphorus ligands are represented by the formula

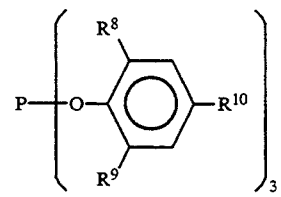

where R⁸ R⁹ and R¹⁰ independently, is a hydrogen atom or an alkyl having from 1 to 10 carbon atoms such as methyl, propyl, isopropyl, butyl, sec butyl, tertiary butyl, and the like, with tertiary butyl being highly preferred, an aryl group, or an alkyl substituted aryl having from 6 to 10 carbon atoms with specific examples including para-tolyl, ortho-tolyl, para-cumyl, and the like. Although R¹⁰ can be hydrogen, at least one of

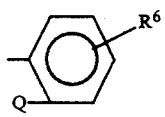

$R^8$ and $R^9$ is not hydrogen. To ensure the existence of bulky groups, desirably secondary alkyl groups are utilized and, preferably, tertiary alkyl or aryl groups. A specific example of a preferred phosphorus ligand is tris(2-t-butyl-4-methylphenyl)phosphite with tris[(2,4-di-t-butylphenyl)phosphite] being highly preferred, that is, Irgafos 168, manufactured by Ciba-Geigy. Generally, mixtures of ligands are not desired inasmuch as the least bulky or sterically hindered ligand is more reactive with the rhodium salt and will displace a more bulky or sterically hindered phosphorus ligand and yield a less active catalyst.

Typically, the hydroformylation reaction involves adding the olefin-containing polyisobutylene dissolved in a suitable solvent to a sealed reactor. As noted above, the polyisobutylene can contain one or more olefin groups. Suitable solvents for the polyisobutylene generally include any inert organic solvent (other than alcohols and primary or secondary amines inasmuch as they will react with the formed aldehyde group) such as hydrocarbons, for example, hexane, toluene, and the like, ethers such as dibutyl ether, ketones such as methylethyl ketone, or amides such as dimethylacetamide with toluene and cyclohexane being preferred. To the reaction vessel is then added the rhodium salt and the phosphorus-containing ligand, both of which are generally dissolved in a solvent compatible with the polyisobutylene and preferably the same solvent. The rhodium catalyst and the ligand form the actual hydroformylation catalyst in situ. The sealed reactor is then flushed several times with a 1:1 mole ratio of carbon monoxide and hydrogen gas. Subsequently, the temperature is increased to a suitable reaction temperature and the pressure also increased to suitable ranges noted hereinabove. The reaction is then allowed to continue generally to ensure high conversions of the olefin group to aldehyde as opposed to other types of end groups such as alcohol, vinyl, etc.

Desired and preferred conversion levels of olefin groups to aldehyde functional groups are generally very high and often 99 or 100 percent in order to readily enable the subsequent preparation of block copolymers. Typically, the conversion is high, i.e., at least 50 percent, often at least 70 percent, generally 80 percent or greater, desirably at least 90 percent, more desirably at least 95, 97, or 98 percent, and preferably at least 99 percent or 99.5 percent with 100 percent being optimum. When the polyisobutylene contains an olefin terminal or end group of the structure as set forth in formula III hereinabove, high conversions generally in excess of 95, 98, or 99 percent and often 100 percent are readily achieved, i.e., Formula III or III-A as set forth below. When polyisobutylene is utilized containing essentially olefin end groups of type I, type II, and type IV, set forth hereinabove, the conversion to aldehyde is generally not as high. Accordingly, the use of polyisobutylenes containing olefin end groups of the type I, type II, and type III are not preferred in the present invention.

When hydroformylated, the polyisobutylene having a type I or I-G structure will predominantly result in the following aldehyde-terminated telechelic polyisobutylene:

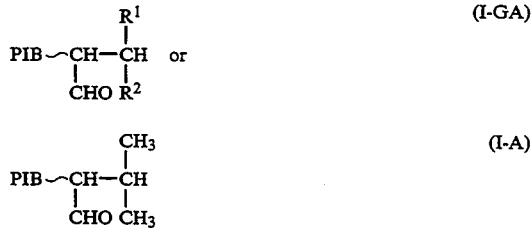

Hydroformylation of the type II or II-G polyisobutylene will result in the following aldehydeterminated telechelic polyisobutylene:

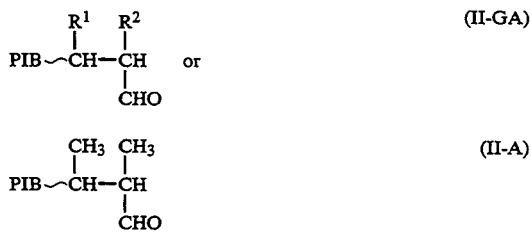

Hydroformylation of the type III or III-G polyisobutylene will result in the following aldehydeterminated telechelic polyisobutylene:

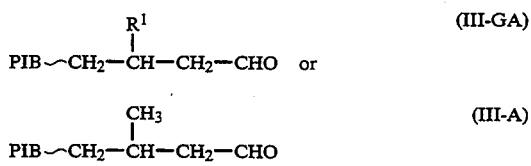

Hydroformylation of the type IV or IV-G polyisobutylene will result in the following aldehyde-terminated telechelic polyisobutylene:

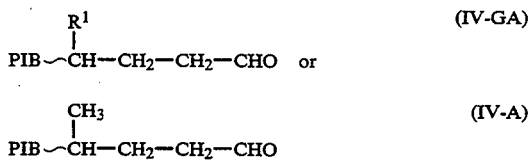

The $R^1$ and $R^2$ groups in the above formulas are the same as previously set forth.

The above formulas are representative of isobutylenes containing one olefin end group. If polyisobutylenes are utilized containing two or more end groups, hydroformylation will occur with respect to all of the terminal or olefin end groups. When polyisobutylenes are utilized which contains two olefin end groups of type I or I-G, when hydroformylated in accordance with the present invention, the following terminated telechelic polyisobutylene predominantly will be formed:

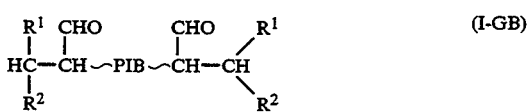

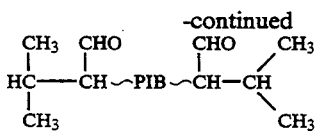

(I-B)

When a polyisobutylene contains two olefin end groups of type II or II-G, hydroformylation in accordance with the present invention will yield predominantly the following aldehyde-terminated telechelic polyisobutylene:

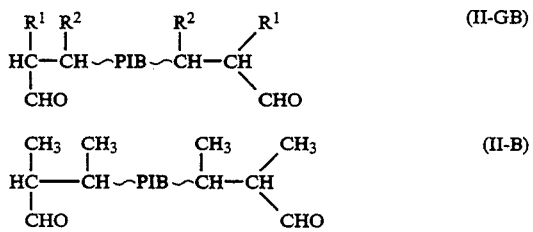

When a polyisobutylene contains two olefin end groups of type III or III-G, hydroformylation in accordance with the present invention will yield predominantly the following aldehyde-terminated telechelic polyisobutylene:

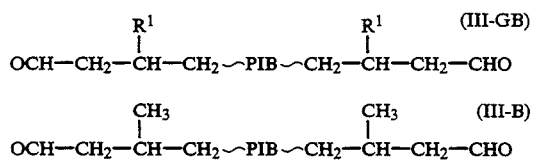

When a polyisobutylene contains two olefin end groups of type IV or IV-G, hydroformylation in accordance with the present invention will yield predominantly the following aldehyde-terminated telechelic polyisobutylene:

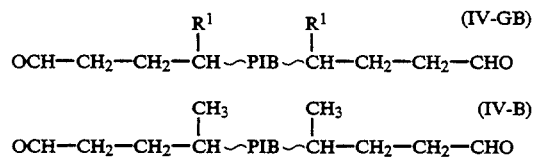

Once again, the $R^1$ and $R^2$ groups in the above formulations are the same as previously set forth. As a practical manner, although the four types of olefin-terminated end groups can be produced, the type III-GB or preferably III-B (dialdehyde terminated polyisobutylend), will exist in a great abundance or majority amount, as in excess of 80 or 90 percent, generally 95 percent, and even 98 or 99 percent.

In a similar manner, polyisobutylenes containing three terminal aldehyde end groups can be produced in a variety of isomers with, once again, the aldehyde isomer end group represented by formula III-A being in a vast majority. Moreover, various star radial polymers having generally four or more arms can also be produced in accordance with the present invention, once again with the large or vast majority of olefin terminal or end groups being an isomer of type III, and thus when hydroformylated has as a terminal aldehyde structure predominantly of formula III-A. In other words, regardless of whether a mono, di, tri, etc., terminated olefin, polyisobutylene is hydroformylated, the general end product can be represented by the formula:

where n=from 1 to about 10, desirably from 1 about 4, or the like. X represents the initiator residue wherein the initiator is disclosed hereinabove which is utilized to form the polyisobutylene. If the initiator is difunctional, polyisobutylene having two olefin terminal or end groups such as isobutylene end groups will be formed. If the initiator is trifunctional, a polyisobutylene having three isobutylene terminal or end groups will be formed, and so forth. Whenever two or more olefin terminal or end groups exist, hydroformylation thereof will generally yield terminal aldehyde end groups of generally the same structure, for example III-A. That is, the polyisobutylene is generally symmetrical in that the terminal aldehyde end groups are predominantly the same although small amounts of polyisobutylenes can have different end groups in the same polymer, for example III-A and IV-A, etc. It is to be understood that the olefin terminal or end group of the general formulation is branched, that is, not straight-chained, and generally has a structure as set forth in formulas I-A, II-A, III-A, or IV-A, or combinations thereof.

Inasmuch as the rhodium catalyst is very expensive, it is desirable to recover the same by conventional methods such as 1) ion exchange, 2) precipitation of the polymer followed by extraction of the rhodium from solution, or 3) by a method in which a polar solvent such as dimethylacetamide is added to the polymeric residue, in which is dissolved a small amount of a more reactive water-soluble ligand, then adding water thereto so that the rhodium catalyst resides within the water phase, and treating the rhodium phosphorus ligand complex with an acid to remove the ligand and recover the rhodium.

An important feature of the present invention that the olefin groups are converted only to aldehyde groups and not any other groups. Thus, the telechelic polyisobutylenes of the present invention are essentially if not completely free of all other end groups such as alcohol, alkyl, and the like.

The invention will be better understood by reference to the following examples which serve to illustrate but not limit the invention.

CHEMICALS

Hexanes (Fisher, 99.9%) were refluxed with conc. $H_2SO_4$ for several days, washed with aqueous $K_2CO_3$ and water, dried over $CaCl_2$, stored over $CaH_2$ under nitrogen, and distilled before use. Isobutylene and methyl chloride were dried by passing the gases through BaO and molecular sieves (4A) filled columns. Titanium tetrachloride (Aldrich, 99.9%), 2,4,4-trimethyl-1-pentene (TMP) (Aldrich, 99%), N,N-dimethylacetamide (DMA) (Aldrich, 99%, anhydrous), potassium tert-butoxide (Aldrich, 95%), rhodium (III) chloride hydrate (Aldrich), tris(2,4-di-t-butylphenyl)-phosphite (IRGAFOS 168) (Ciba Geigy), pentaerythritol (Aldrich, 98%), triethylphosphite (Eastman, 98%), phenol (Fisher, 99.9%), and methanol (Fisher, 99.9%) were used as received.

SYNTHESES

Cyclooctadiene rhodium acetate (CODRhAc) was prepared following the procedure of Chatt and Venanzi, J. Chem. Soc., 1957, p. 4735. Essentially $RhCl_3.3H_2O$ was refluxed with cyclooctadiene in ethanol for 3 hours to afford CODRhAc. The resulting orange solid was filtered off and dissolved in acetone. Potassium acetate was added and the mixture refluxed for 2 hours. The orange residue was dissolved in ethyl acetate and recrystallized to give orange crystals of CODRhAc.

4-Hydroxymethyl-2,6,7-trioxa-phosphabicyclo[2,2,-2]octane was synthesized according to C. F. Baranauckas and I. Gordon, U.S. Pat. No. 3,511,857, May 12, 1970. Pentaerythritol (13.6 g, 0.1 mole), triethylphosphite (20.7 mL, 0.1 mole), phenol (56 g), and methanol solution of sodium methoxide (0.24 g in 2 mL) were mixed in a flask equipped with a magnetic stirrer and a Wurtz adapter and heated for 1.5 hours at from 115° to 150° C. When the condensate stopped collecting, the reaction mixture was vacuum-stripped of phenol at 93°–114° C./20 mm Hg leaving a colorless, viscous product.

2-chloro-2,4,4-trimethylpentane (TMPCl) was prepared by the method described for the synthesis of chlorocyclooctane (S. A. Miller and W. O. Jones, British Patent 738,992, Oct. 26, 1955. Chem. Abstract 50, 10768f (1956). Dry hydrogen chloride was bubbled at ambient temperature through the mixture of TMP (2-methyl,4,4-dimethyl pentene) (50 g) and dry benzene (50 mL) saturated with $ZnCl_2$. The reaction is fast, so that its rate is determined by the flow of HCl. A water bath was applied to remove heat especially in the early stages of the reaction. The reaction was allowed to proceed 6 hours to ensure total conversion. Finally the excess HCl was flushed away by the stream of dry nitrogen. The neat product was isolated in nearly quantitive yield (~90%) by fractional distillation (column of 15 cm height filled with glass helices). B. p. 55.5° C./14 mm Hg. $^1$H NMR 1.02(s,9H, $C(CH_3)_3$); 1.64 (s,6H,$C(CH_3)_2$); 1.85 (s,2H,$CH_2$).

α-tert-butyl-ω-tert-chloropolyisobutylene

The chlorine-terminated polyisobutylene was synthesized according to G. Kaszas, J. E. Puskas, J. P. Kennedy and C. C. Chen, J. Macromol. Sci.-Chem., A26, No. 8, p. 1099. Hexanes (400 mL), methyl chloride (270 mL), TMPCl (0.66 mL, 4 mmoles), and DMA (1.1 mL, 12 mmoles) were transferred into a 2 L round bottom flask at −80° C. and $TiCl_4$(5.3 mL, 48 mmoles) was added while stirring. The yellow heterogeneous mixture was stirred for 15 minutes and then isobutylene (55 mL, 0.7 mole) was gradually added during 3 minutes under extensive stirring. The polymerization was carried out for 30 minutes. The reaction mixture was then transferred into the beaker and the $TiCl_4$ was decomposed by excess methanol (~600 mL). After evaporation of the methyl chloride and most hexanes, the methanol layer was removed and the polymer was dissolved in hexanes. The solution (~20%) was washed five times with excess water and dried over anhydrous $Na_2SO_4$. The solvent was removed on a rotary evaporator, the polymer was then dried in vacuo and analyzed by $^1$H NMR spectroscopy and GPC. The product was the expected α-tert-butyl-ω-tert-chloropolyisobutylene with $\overline{M}_n$=10,600 g/mole and $\overline{M}_w/\overline{M}_n$=1.12.

α-tert-butyl-ω-(2-methylprop-2-enyl)-polyisobutylene. The dehydrochlorination of α-tert-butyl-ω-tert-chloropolyisobutylene was carried out using t-BuOK in boiling THF according to the method of J. P. Kennedy, V. S. C. Chang, R. A. Smith, and B. Ivan, Polymer Bulletin, 1979, 1, p. 575. Thus to a solution of polymer in dry THF (40g in 270 mL), t-BuOK (1.2 g, 3-fold mol. excess to Cl) was added and the stirred mixture was refluxed under nitrogen for two days. Upon cooling, the reaction mixture was gradually added with stirring to excess water. The water layer was then removed and hexanes (100 mL) were added. The hexane solution of the polymer was washed five times with water and dried over anhydrous sodium sulfate. The hexanes were removed on the rotary evaporator, the polymer was dried in vacuo and analyzed by $^1$H NMR spectroscopy and GPC. The product was the expected α-tert-butyl-ω-(2-methylprop-2-enyl)-polyisobutylene ($\overline{M}_n$=10,500 g/mole and $\overline{M}_w/\overline{M}_n$=1.11). $^1$H NMR 1.08 (s,$C(CH_3)_2$); 1.38 (s, $CH_2$); 4.64, 4.85 (m,=$CH_2$).

EXAMPLE 1

Hydroformylation

The various components were all introduced into a sealed reactor via a catalyst injection syringe under nitrogen. The above polymer (40 g) was dissolved in toluene (60 mL) and introduced into the reactor, followed by IRGAFOS 168 (tris(2,4-di-t-butylphenyl)-phosphite) (2.34 g, 3.6 mmoles) and CODRhOAc (cyclooctadiene rhodium acetate) (0.09 g, 0.36 mmole) both dissolved in a little toluene. The latter two form in situ the actual hydroformylation catalyst. The reactor was then flushed 3 times with a 1:1 mol:mol mixture of carbon monoxide and hydrogen (Matheson gas) and heated to 80° C. while the pressure was increased to 270 psi. For the first 4–6 hours, the reactor was vented to 200 psi and then recharged to 270 psi every 30 minutes. The purpose of this flushing procedure is to prevent build-up of CO or $H_2$ in case the molar ratio of the two gases is not exactly 1:1. Excess CO would stop the reaction while excess $H_2$ can lead to olefin isomerization and hydrogenation. Typically the reaction was allowed to continue overnight to ensure 100% conversion.

The extraction of rhodium from the toluene solution of polymer was carried out according to the modified procedure of B. L. Goodall and P. A. M. Grotenhuis, U.S. Pat. No. 4,680,168. To the reaction mixture, the 4-hydroxymethyl-2,6,7-trioxaphosphabicyclo[2,2,2] octane solution in n-butanol (0.9 g, 5.5 mmoles in 30 mL) was added and the transparent solution left overnight. The solution was extracted 5 times with water and the polymer precipitated into methanol. The polymer was re-precipitated from hexanes into methanol and dried in vacuo at ambient temperature. According to $^1$H NMR and GPC analysis, the product is the expected α-tert-butyl-ω-oxopolyisobutylene ($\overline{M}_n$10,500 g/mole and $\overline{M}_w$=1.12), $^1$H NMR (Bruker 500 MHz) 9.74 (t,CHO). Such parameters of the $^1$H NMR spectrum as the triplet structure of the aldehyde proton signal ($^3J_{H,H}$2 Hz) the absence of the other aldehyde signals, and trace signals in the region of starting double bonds indicate high efficiency and selectivity of the process yielding to the polyisobutylene terminated with the primary aldehyde and functionality very close to 1 (at least 0.9). GPC data show that the molecular weight and MWD of the polymer are not affected by the hydroformylation step. This means that the reaction is free from side reactions such as aldol condensation that would increase the $M_n$ of the polymer. The type of aldehyde-terminated telechelic polyisobutylene produced was type III at least about 99 percent, and the amount converted to aidehyde, that is, to type III-A, was also at least about 99 percent by weight.

EXAMPLE 2

Apart from the monofunctional polymer, the procedure described in Example 1, with the same amount of components, was also applied to make a difunctional polymer. The starting material was linear 2-methylpropylidene telechelic difunctional polyisobutylene ($\overline{M}_n$2,000 g/mole) with $\sim CH_2CH(CH_3)\!=\!\!CH_2$ groups on both ends (J. P. Kennedy, V. S. C. Chang, R. A. Smith, and B. Ivan, Polymer Bulletin, 1979, 1, p. 575). The analysis of hydroformylated polymer revealed the same high efficiency and selectivity of the process. At least about 99 percent by weight of difunctional polyisobutylene was produced having oligomer end groups of type III, and the amount of such end groups converted to aldehyde was at least 99 percent by weight such that the end product was essentially an aidehyde-terminated telechelic polyisobutylene of the structure of III-B set forth hereinabove.

EXAMPLE 3

In a manner similar to Example 1, a tri-olefin ended polyisobutylene (made using tricumyl chloride as initiator) was converted into a tri-aldehyde terminated polymer. The polymer (40 g., dissolved in toluene, 60 ml.) was introduced into the reactor, followed by Irgafos 168 (2.34 g., 3.6 mmol.) and CODRh acetate (0.09 g., 0.17 mmol.) each dissolved in toluene (20 ml.). The reactor was flushed three times with an equimolar mixture of CO and $H_2$ and then heated to 80° C. and pressurized to 270 psig. For the first five hours, the reactor was vented to 200 psig and then repressurized to 270 psig with the same $CO/H_2$ mixture. After twenty-four hours, the reaction was stopped by cooling to ambient temperature and venting the gas mixture. After isolation, the polymer was analyzed by proton NMR in $CDCl_3$ as solvent. The aldehyde region showed a single signal at 9.74 ppm indicating essentially 100 percent selectivity to the desired primary aldehyde end group. The only signal remaining in the olefinic region was a very small one at 5.15 ppm due to trace amounts of the internal double bond ($-CH\!=\!CR_2$) present in the PIB starting material. All of the signals at 4.64 and 4.85 ppm in the starting material (assigned to the exo-double bond end groups) had disappeared indicating complete conversion. The polymer had a pale yellow color due to rhodium residues which were not extracted in this case. Hydroformylation of the olefinic end groups of the trifunctional polymer which was undoubtedly type-3 resulted in at least 99 percent conversion to aldehyde groups.

According to the present invention, the extremely high conversion of the olefin groups to aldehyde telechelic groups on the polyisobutylene is important since high selectivity readily yields desired block copolymers. Such aidehyde-terminated telechelic polyisobutylenes can be used to produce block copolymers by a variety of coupling or condensation routes. Moreover, the aldehyde groups can be reduced to form alcohols which can subsequently be utilized to form block copolymers as is well known to the art and to the literature, for example, as through hydrogenation using a suitable catalyst such as platinum on carbon.

The aidehyde-terminated telechelic polyisobutylene polymers of the present invention are useful as adhesives or sealants for construction materials when generally used in association with short linking molecules such as hydrazine and the like. Inasmuch as the block copolymers have a flexible elastomer portion, i.e., the polyisobutylene, and a thermoplastic portion, they can be utilized in any thermoplastic elastomer situation or end use such as for shoe soles, medical applications such as tubing, containers, bottle caps, and the like. The advantage of the block copolymers of the present invention inasmuch as the elastomer portion is polyisobutylene, is that they are already fully saturated and do not require the expense or the necessity of a hydrogenation step. Moreover, such block copolymers have good (i.e., high) hysteresis, good gas barrier properties (i.e., low gas transmission rates), good oxidative resistance and the like.

The various aidehyde-terminated polyisobutylenes of the present invention and the optional subsequently alcohol-terminated polyisobutylenes can be reacted with any group which reacts with the aldehyde or alcohol-terminated group. For example, they can be reacted with one or more vinyl-type monomers such as vinyl substituted aromatics having from 8 to 12 carbon atoms, e.g., styrene, α-methylstyrene, and the like, to produce block copolymers. Block copolymers can also be made by reacting the telechelic functional polymers of the present invention with various amine or diamine-containing monomers or compounds such as peptides, amino acids, proteins, and the like.

Alternatively, block copolymers can be made by reaction of suitable functional groups of existing polymers. For example, urethane-polyisobutylene blocks can be made by reacting the aldehyde or alcohol end group with a free isocyanate. Depending upon whether a tri- or tetra-functional isocyanate is utilized, cross-linked urethanes can be formed. The telechelic polymers of the present invention can also be reacted with polyesters to form polyisobutylene-polyester blocks. Other block copolymers can be made wherein the non-isobutylene portion is generally analogous to compounds utilizing the various Kraton ® block copolymers known to the art and to the literature.

While in accordance with the Patent Statutes, the best mode and preferred embodiment has been set forth, the scope of the invention is not limited thereto, but rather by the scope of the attached claims.

What is claimed is:

1. An elastomeric composition, comprising:
    terminal functional ditelechelic polyisobutylenes wherein at least 80 percent of said terminal functional groups are an aldehyde group.

2. An elastomeric composition according to claim 1, wherein at least 90 percent of said terminal functional groups are an aldehyde group, and wherein the molecular weight of said ditelechelic polyisobutylene is from about 300 to about 200,000.

3. An elastomeric composition according to claim 1, wherein at least 95 percent of said terminal functional groups are an aldehyde group, and wherein the molecular weight of said ditelechelic polyisobutylene is from about 550 to about 20,000, and wherein said terminal groups are derived from isobutylene.

4. An elastomeric composition, comprising:
    terminal functional tritelechelic polyisobutylene wherein at least 80 percent of said terminal functional groups are an aldehyde group.

5. An elastomeric composition according to claim 4, wherein at least 90 percent of said terminal functional groups are an aldehyde group, and wherein the molecular weight of said tritelechelic polyisobutylene is from about 300 to about 200,000.

6. An elastomeric composition according to claim 4, wherein at least 97 percent of said terminal functional groups are an aldehyde group, and wherein the molecular weight of said tritelechelic polyisobutylene is from about 550 to about 20,000, and wherein said terminal groups are derived from isobutylene.

7. An elastomeric composition, comprising:
radial telechelic polyisobutylenes containing from four to ten terminal functional telechelic groups, wherein at least 80 percent of said terminal functional groups are an aldehyde group.

8. An elastomeric composition according to claim 7, wherein at least 90 percent of said terminal functional groups are an aldehyde group, and wherein the molecular weight of said radial telechelic polyisobutylene is from about 300 to about 200,000.

9. An elastomeric composition according to claim 7, wherein at least 97 percent of said terminal functional groups are an aldehyde group, wherein the molecular weight of said radial telechelic polyisobutylene is from about 550 to about 20,000, and wherein said terminal groups are derived from isobutylene.

10. An aldehyde telechelic polyisobutylene of the formula:

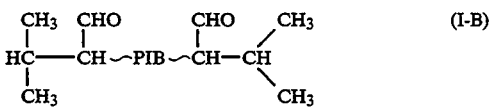

or

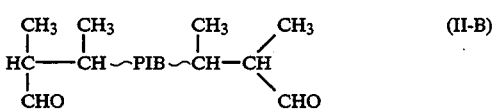

or

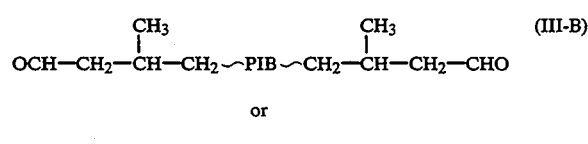

or

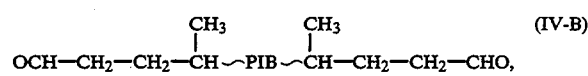

or combinations thereof.

11. An aldehyde telechelic polyisobutylene according to claim 10, wherein the molecular weight of said polyisobutylene is from about 300 to about 200,000.

12. An aldehyde telechelic polyisobutylene according to claim 10, wherein the molecular weight of said polyisobutylene is from about 550 to about 20,000.

13. A terminal aldehyde telechelic polyisobutylene, of the formula:

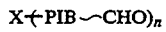

where n is from 2 to about 10, said PIB being a polyisobutylene polymer having a molecular weight of from about 300 to about 200,000 and wherein X is the residue of a polyisobutylene initiator.

14. An aldehyde telechelic polyisobutylene according to claim 13, wherein the molecular weight is from about 500 to about 50,000, and wherein n is 4 to 10.

15. An aldehyde telechelic polyisobutylene according to claim 13, wherein the molecular weight is from about 500 to about 20,000, and wherein n is 4 to 10.

16. An aldehyde telechelic polyisobutylene of the formula:

having a molecular weight of from about 300 to about 200,000.

17. An aldehyde telechelic polyisobutylene according to claim 16, having a molecular weight of from about 550 to about 20,000.

18. An aldehyde telechelic polyisobutylene of the formula:

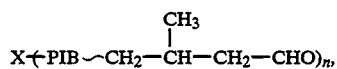

where n is 3 or 4, and wherein the molecular weight of said polyisobutylene is from about 300 to about 200,000.

19. An aldehyde telechelic polyisobutylene according to claim 18, wherein the molecular weight is from about 550 to 20,000.

20. The reaction product of a polyisobutylene containing from two to ten terminal functional olefin groups with carbon monoxide and hydrogen in the presence of a rhodium catalyst-phosphorus ligand complex to produce terminal functional polytelechelic polyisobutylenes wherein at least 80 percent of said terminal functional groups are an aldehyde group.

21. A reaction product according to claim 20, wherein the molecular weight of said polyisobutylene is from about 300 to about 200,000.

22. The reaction product according to claim 21, wherein the mole ratio of said hydrogen to said carbon monoxide is from about 0.9 to about 2.0.

23. A reaction product according to claim 22, wherein said phosphorus ligand has the general formula:

wherein P represents a phosphorus moiety and $R^1$, $R^2$, and $R^3$ represent similar or dissimilar aryl groups provided that at least one of $R^1$, $R^2$, and $R^3$ represents a group

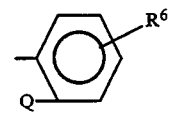

wherein Q represents a group

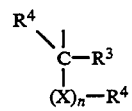

or a group

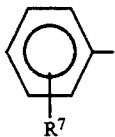

wherein each $R^4$ which may be the same or different and is hydrogen or a fluorine-containing hydrocarbyl group having from 1 to 10 carbon atoms, $R^5$ represents a hydrogen atom or an $R^4$ group, $R^6$ represents a hydrogen atom or an inert substituent on the meta and/or para position of the ring, and X represents an oxygen or sulphur atom and n is 0 or 1, and $R^7$ represents a hydrogen atom or an alkyl, aryl, alkoxy, aryloxy, chlorine or fluorine.

24. A reaction product according to claim 23, wherein said hydrogen to carbon monoxide mole ratio is from about 0.9 to about 1.5, and wherein said molecular weight is from about 500 to about 50,000.

25. A reaction product according to claim 24, wherein said mole ratio of hydrogen to carbon monoxide is from about 0.9 to about 1.1, wherein said $R^1$, $R^2$, and $R^3$ of said phosphorus ligand is an ortho-substituted phenyl group, wherein $R^4$ is methyl or ethyl, wherein $R^5$ is a hydrogen atom or methyl, wherein $R^6$ is a hydrogen atom, or methyl or ethyl and n is 0 and $R^7$ is a hydrogen, and wherein said rhodium catalyst is an organic rhodium salt, or is an inorganic rhodium salt.

26. A reaction product according to claim 25, wherein said molecular weight is from about 550 to about 20,000, wherein said rhodium catalyst is cyclooctadiene rhodium acetate and wherein said phosphorus ligand is tris[(2,4-di-t-butylphenyl)phosphite].

27. A reaction product according to claim 20, wherein at least 80 percent of all of said olefin groups have been converted to an aldehyde containing group.

28. A reaction product according to claim 23, wherein at least 90 percent of all said olefin groups have been converted to an aldehyde containing group.

29. A reaction product according to claim 26, wherein at least 98 percent of all said olefin groups have been converted to an aldehyde containing group.

* * * * *

UNITED STATES PATENT AND TRADEMARK OFFICE
CERTIFICATE OF CORRECTION

PATENT NO. : 5,340,881

DATED : August 23, 1994

INVENTOR(S) : Joseph P. Kennedy, Brian L. Goodall, Alexander V. Lubnin

It is certified that error appears in the above-indentified patent and that said Letters Patent is hereby corrected as shown below:

On title page, item [54] and col. 1, line 6, "THEREFORM" should read

--THEREFROM--

Signed and Sealed this

Twenty-ninth Day of November, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,340,881
DATED : August 23, 1994
INVENTOR(S) : Kennedy et al.

It is certified that error appears in the above-indentified patent and that said Letters Patent is hereby corrected as shown below:

In column 16, in the last formula, delete "$R^3$" and insert therefor --$R^5$--, so that the formula reads as:

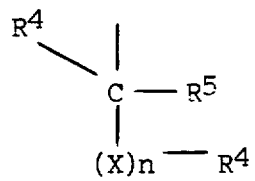

Signed and Sealed this

Seventh Day of November, 1995

Attest:

BRUCE LEHMAN

Attesting Officer      Commissioner of Patents and Trademarks